Dec. 23, 1958  R. M. KLINE  2,865,369
VALVE STRUCTURE FOR SUBMARINE BREATHING APPARATUS
Filed Sept. 26, 1955
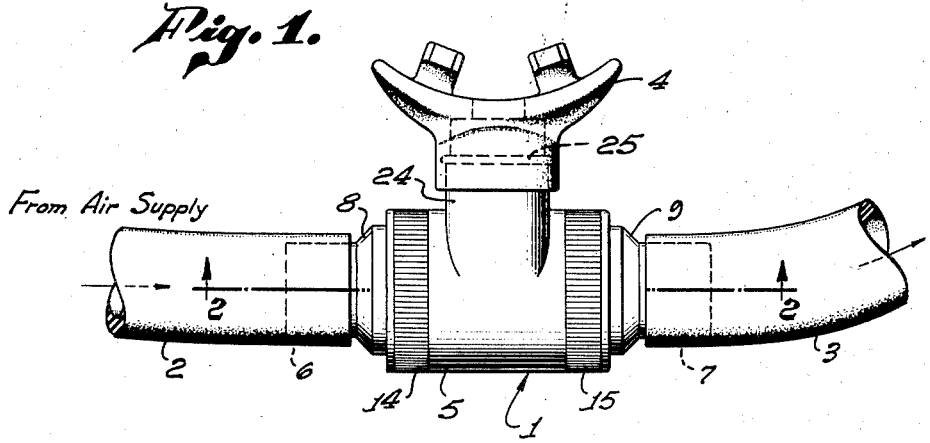
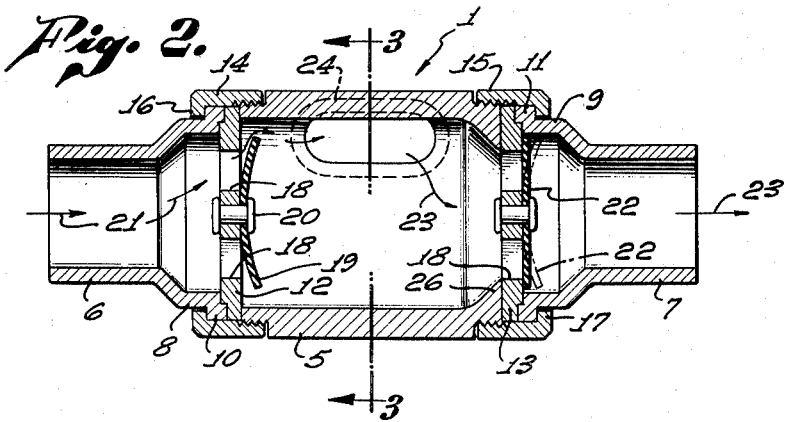
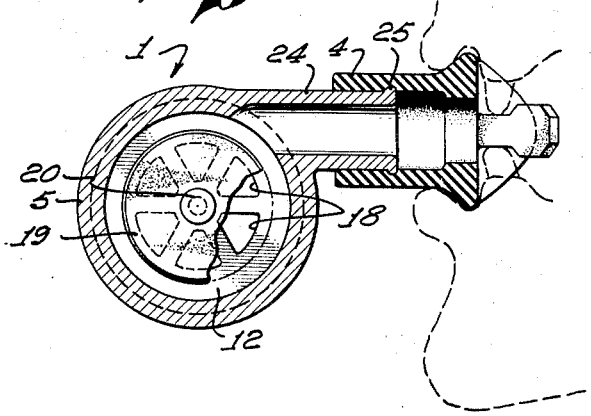
RICHARD M. KLINE,
INVENTOR.
BY Flam and Flam
ATTORNEYS.

United States Patent Office 2,865,369
Patented Dec. 23, 1958

2,865,369

VALVE STRUCTURE FOR SUBMARINE BREATHING APPARATUS

Richard M. Kline, Los Angeles, Calif.

Application September 26, 1955, Serial No. 536,525

1 Claim. (Cl. 128—142)

This invention relates to skin-diving equipment, and particularly to valve mechanisms for the inhalation and exhalation of air by the diver.

Equipment for supplying air to the diver while submerged is now in common use. Such equipment may include a tank or tanks of compressed air, the supply being controlled by a regulator. The equipment may also include an inhalation hose leading from the regulator to a mouthpiece adapted to be placed between the lips of the diver. From the mouthpiece there also extends a conduit defining an exhalation passage. Valves are commonly in use to control the inhalation and exhalation passages, so that they are alternatively active in the process of breathing.

It is one of the objects of this invention to provide a simple, compact and inexpensive valve structure of the character required for inhalation and exhalation.

It is another object of this invention to provide a valve structure that may readily be taken apart and re-assembled, for repair, cleaning or replacement.

The invention may be utilized in connection with other forms of breathing apparatus, as for gas masks, "snorkels," or the like.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claim.

Referring to the drawings:

Figure 1 is a plan view of a valve structure incorporating the invention;

Fig. 2 is an enlarged sectional view, taken along a plane corresponding to line 2—2 of Fig. 1; and Fig. 3 is a cross-sectional view, taken along a plane corresponding to line 3—3 of Fig. 2.

The valve structure 1, as shown in the present instance, is adapted to be used in connection with underwater breathing, or the like. For this purpose, there is a supply hose 2 forming an inlet passageway to the interior of the valve structure 1. This supply hose may be connected to a compressed air tank and pressure regulator usually employed by skin divers. At the opposite end of the valve structure 1, a similar hose connection 3 is provided for passing exhaled air into the surrounding medium. Appropriate valves, for inlet and outlet purposes, are provided as hereinafter described.

Intermediate the passageways formed by the hoses 2 and 3, there is provided a mouthpiece structure 4 (Figs. 1 and 3) of rubber or the like, and having a portion adapted to be disposed between the lips of a diver. Since this mouthpiece structure may be of any desired form, further description thereof is unnecessary. The arrangement is such that upon inhalation, the valve structure 1 is arranged to permit air to pass from hose 2 to the mouthpiece 4. Upon exhalation, the inlet valve closes, and the outlet valve opens for passing the exhaled air through the hose 3 to the surrounding medium. When the diver is neither inhaling or exhaling, both valves are biased to closed position.

The valve structure includes a hollow casing 5 of generally cylindrical form. The ends of this casing are open. They are of reduced diameter and are exteriorly threaded. Detachable tubular extensions 6 and 7 are detachably attached to these open ends to form, respectively, inlet and outlet passageways to the interior of the casing 5. The hoses 2 and 3 telescope over the tubular ends of the extensions 6 and 7 respectively. Clamps (not shown) constrict the ends of the hoses 2 and 3 about the extensions and not only prevent separation of the hoses of the extensions but establish a seal between the hoses and the extensions. Each of these extensions has an enlarged base portion 8 or 9 opposite the ends which cooperate with the hoses 2 and 3. These flanges are each provided with a flange 10 or 11.

Interposed between the flange 10 and the left-hand end of the casing 5 is a detachable apertured valve seat 12. A similar valve seat 13 is interposed between the right-hand end of casing 5 and the flange 11. Furthermore, each of the valve seats 12 and 13 has an edge of reduced thickness so as to form interfitting shoulders between the respective tubular extensions and seats.

In order to maintain the extensions 6—7 and seats 12—13 in assembled relation with respect to the casing 5, use is made of a pair of interiorly threaded holding rings 14 and 15. These rings engage the reduced threaded end of the casing 5. Each of them, furthermore, has a flange 16 and 17, respectively, overlying the flanges 10 and 11, so as to clamp the parts together. The exterior cylindrical surfaces of these rings 14 and 15 may be knurled as indicated in Fig. 1.

Each of the valve seats 12 and 13 is provided with a series of through apertures 18 through which air can pass either into or out of the casing 5.

In order to provide a valve action with respect to the valve seat 12, a resilient disc valve closure 19, such as of rubber, is provided. This disc closure is held concentrically with the seat 12 by the aid of any appropriate fastening means, such as a rivet 20. The disc 19 is inherently biased resiliently to overlie the apertures 18. In this way, air can pass only into the casing through the tubular extension 6 and past the outer edge of closure 19, as indicated by the arrows 21. Reverse movement of air through extension 6 is prevented, since such attempted movement would urge the disc 19 against the right-hand side of the closure 12.

Similarly, the valve seat 13 is also provided with a valve closure 22 also made of resilient material such as rubber. In this instance, the valve closure 22 is placed on the right-hand side of the valve seat 13, so that air can pass only outwardly of the casing 5 through the extension 7, as indicated by arrows 23. The casing 5 has a tapered interior portion 26 to produce a smooth flow of air, without turbulence, to the apertures 18 of seat 13.

Thus, in the process of inhalation and exhalation, alternatively, the valve closures 19 and 22 are displaced from their seats. Reverse flow is prevented by the resilient action of the closures 19 and 22.

The casing 5, extensions 6 and 7, valve seats 12 and 13, and rings 14 and 15 may be appropriately made of molded plastic material.

The mouthpiece 4, which may also be made of rubber, is removably telescoped over the tubular extension 24 connecting with the interior of casing 5. This tubular extension projects substantially tangentially with respect to the interior of the casing 5, as indicated most clearly in Fig. 3. Furthermore, it may be provided with a rounded rim 25 (Fig. 3) for ensuring a firm grip between the tubular member 24 and the rubber mouthpiece 4.

In the position shown in Fig. 2, the inhalation valve closure 19 is indicated as open, and the exhalation valve closure 22 is shown as closed. Thus, only one of them is opened at any one time in the process of inhalation or exhalation. When neither inhalation or exhalation takes place, both of the discs 19 and 22 are resiliently held against the valve seats 12 and 13.

The parts of the device can be readily taken apart and reassembled for repair, replacement or cleaning.

The inventor claims:

In a valve structure for submarine breathing apparatus or the like: a hollow open-ended generally cylindrical casing having opposite ends of reduced diameter, the opposite ends being exteriorly threaded; the ends of the casing having annular surfaces; said casing having an interior surface converging toward one end; means forming a transverse mouthpiece passage communicating with the interior of the casing intermediate its ends; a first valve seat disc having a series of angularly spaced ports; the peripheral portion of the first disc engaging said annular surface at said one end of said casing and conforming in size thereto; a thin resilient circular closure carried by said first disc and normally overlying said ports of said first disc, and located on the outer side of said first disc; the peripheral portion of said first disc having an edge of reduced thickness to provide an annular shoulder facing outwarly of the casing; a first tubular extension having a diverging base provided with a flange at its end interfitting the first disc at its reduced edge, said flange of said first extension conforming in size to said one end of said casing; a first holding ring threadedly engaging said one casing end, and having a flange overlying the flange of said first tubular extension for detachably clamping the first tubular extension and said first disc to said one casing end; a second valve seat disc having a series of angularly spaced ports; the peripheral portion of the second disc engaging said annular surface of the other end of said casing and conforming in size thereto; a thin resilient circular closure carried by said second disc and overlying said ports of said second disc, and located on the inner side of said second disc; the peripheral portion of said second disc having an edge of reduced thickness providing an annular shoulder facing outwardly of the casing; a second tubular extension having a diverging base provided with a flange at its end interfitting the second disc at its reduced edge, said flange of said second extension conforming in size to said other end of said casing; and a second holding ring threadedly engaging said other casing end; and having a flange overlying the flange of said second tubular extension for detachably clamping the second tubular extension and said second disc to said other casing end; the diverging base portions of said extensions and the converging interior surface of said casing providing smooth flow of air through the casing in response to inhalation and exhalation through said transverse mouthpiece passage.

References Cited in the file of this patent

UNITED STATES PATENTS

| 646,902 | Haeberle | Apr. 3, 1900 |
| 804,272 | Schwarz | Nov. 14, 1905 |
| 1,055,117 | Woodworth | Mar. 4, 1913 |
| 1,404,408 | Rosling | Jan. 24, 1922 |

FOREIGN PATENTS

| 27,599 | Great Britain | 1903 |